US008681191B2

(12) United States Patent
Yang et al.

(10) Patent No.: US 8,681,191 B2
(45) Date of Patent: Mar. 25, 2014

(54) THREE DIMENSIONAL DRIVING SCHEME FOR ELECTROPHORETIC DISPLAY DEVICES

(75) Inventors: Bo-Ru Yang, Banqiao (TW); Ying-Tsang Liu, Taipei (TW); Chun-An Wei, Pan-Chiao (TW); Craig Lin, San Jose, CA (US)

(73) Assignee: SiPix Imaging, Inc., Fremont, CA (US)

( * ) Notice: Subject to any disclaimer, the term of this patent is extended or adjusted under 35 U.S.C. 154(b) by 165 days.

(21) Appl. No.: 13/178,987

(22) Filed: Jul. 8, 2011

(65) Prior Publication Data
US 2012/0007897 A1  Jan. 12, 2012

Related U.S. Application Data

(60) Provisional application No. 61/362,683, filed on Jul. 8, 2010.

(51) Int. Cl.
*G09G 5/10* (2006.01)
(52) U.S. Cl.
USPC .......................... 345/690; 345/107; 359/296
(58) Field of Classification Search
USPC ......... 345/84, 88, 89, 107, 690; 359/228, 296
See application file for complete search history.

(56) References Cited

U.S. PATENT DOCUMENTS

| 4,648,956 A * | 3/1987 | Marshall et al. ............. 359/296 |
| 4,690,749 A | 9/1987 | Van Alstine et al. | |
| 6,400,492 B1 * | 6/2002 | Morita et al. ................. 359/296 |
| 7,230,751 B2 * | 6/2007 | Whitesides et al. .......... 359/296 |
| 7,408,696 B2 * | 8/2008 | Liang et al. .................... 359/296 |
| 8,232,961 B2 * | 7/2012 | Fan et al. ........................ 345/107 |
| 2003/0034950 A1 * | 2/2003 | Liang et al. ................... 345/107 |
| 2005/0212748 A1 * | 9/2005 | Matsuura et al. ............. 345/107 |
| 2006/0209010 A1 * | 9/2006 | Ding et al. ..................... 345/107 |
| 2007/0211017 A1 * | 9/2007 | Cernasov ....................... 345/107 |
| 2008/0273237 A1 * | 11/2008 | Baesjou et al. ............... 359/296 |
| 2009/0213452 A1 * | 8/2009 | Lin et al. ........................ 359/296 |
| 2009/0251763 A1 * | 10/2009 | Sprague et al. ............... 359/296 |
| 2009/0273827 A1 * | 11/2009 | Lin et al. ....................... 359/296 |
| 2010/0053728 A1 * | 3/2010 | Lin et al. ....................... 359/296 |
| 2010/0060628 A1 * | 3/2010 | Lenssen et al. ............... 345/214 |
| 2011/0261433 A1 * | 10/2011 | Sprague et al. ............... 359/296 |

FOREIGN PATENT DOCUMENTS

JP          2004-20818       *   1/2004
WO       WO 9953373  A1 * 10/1999

OTHER PUBLICATIONS

Kao, W.C., (Feb. 2009) Configurable Timing Controller Design for Active Matrix Electrophoretic Display. *IEEE Transactions on Consumer Electronics*, 2009, vol. 55, Issue 1, pp. 1-5.

(Continued)

*Primary Examiner* — Joe H Cheng
(74) *Attorney, Agent, or Firm* — Perkins Coie LLP

(57) ABSTRACT

The present invention is directed to a driving method, in particular a three dimensional driving scheme for electrophoretic display devices. The method comprises applying a driving step in each of at least two electric fields to drive two types of pigment particles of different colors laterally and/or vertically for separately adjusting the grayscale and/or colors of the display. The present driving method has the advantage that the brightness and color intensity of the images may be separately tuned.

23 Claims, 15 Drawing Sheets

(56) References Cited

OTHER PUBLICATIONS

Kao, W.C., Fang, C.Y., Chen, Y.Y., Shen, M.H. and Wong, J. (Jan. 2008) Integrating Flexible Electrophoretic Display and One-Time Password Generator in Smart Cards. *ICCE 2008 Digest of Technical Papers*, P4-3. (Int'l Conference on Consumer Electronics, Jan. 9-13, 2008).

Kao, W.C., Ye, J.A. and Lin, C. (Jan. 2009) Image Quality Improvement for Electrophoretic Displays by Combining Contrast Enhancement and Halftoning Techniques. *ICCE 2009 Digest of Technical Papers*, 11.2-2.

Kao, W.C., Ye, J.A., Chu, M.I. and Su, C.Y. (Feb. 2009) Image Quality Improvement for Electrophoretic Displays by Combining Contrast Enhancement and Halftoning Techniques. *IEEE Transactions on Consumer Electronics*, 2009, vol. 55, Issue 1, pp. 15-19.

Kao, W.C., Ye, J.A., Lin, F.S., Lin, C. and Sprague, R. (Jan. 2009) Configurable Timing Controller Design for Active Matrix Electrophoretic Display with 16 Gray Levels. *ICCE 2009 Digest of Technical Papers*, 10.2-2.

Sprague, R.A. (May 18, 2011) *Active Matrix Displays for e-Readers Using Microcup Electrophoretics*. Presentation conducted at SID 2011, 49 Int'l Symposium, Seminar and Exhibition, May 15-May 20, 2011, Los Angeles Convention Center, Los Angeles, CA, USA.

\* cited by examiner

THREE DIMENSIONAL DRIVING SCHEME FOR ELECTROPHORETIC DISPLAY DEVICES

This application claims priority to U.S. Provisional Application No. 61/362,683, filed Jul. 8, 2010; the content of which is incorporated herein by reference in its entirety.

FIELD OF THE INVENTION

The present invention is directed to a driving method, in particular a three dimensional driving scheme for electrophoretic display devices.

BACKGROUND OF THE INVENTION

An electrophoretic display (EPD) is a non-emissive device based on the electrophoresis phenomenon influencing charged pigment particles dispersed in a dielectric solvent. An EPD typically comprises a pair of spaced-apart plate-like electrodes. At least one of the electrode plates, typically on the viewing side, is transparent. An electrophoretic fluid composed of a dielectric solvent with charged pigment particles dispersed therein is enclosed between the two electrode plates.

An electrophoretic fluid may have one type of charged pigment particles dispersed in a solvent or solvent mixture of a contrasting color. In this case, when a voltage difference is imposed between the two electrode plates, the pigment particles migrate by attraction to the plate of polarity opposite that of the pigment particles. Thus, the color showing at the transparent plate can be either the color of the solvent or the color of the pigment particles. Reversal of plate polarity will cause the particles to migrate back to the opposite plate, thereby reversing the color.

Alternatively, an electrophoretic fluid may have two types of pigment particles of contrasting colors and carrying opposite charges and the two types of pigment particles are dispersed in a clear solvent or solvent mixture. In this case, when a voltage difference is imposed between the two electrode plates, the two types of pigment particles would move to opposite ends (top or bottom) in a display cell. Thus one of the colors of the two types of pigment particles would be seen at the viewing side of the display cell.

Conventional methods for driving an electrophoretic display device involve changing positions of the charged particles in either the vertical (i.e., up/down) or horizontal (i.e., left/right) direction. As a result, the color intensity (i.e., saturation) and the brightness (i.e., reflectance) of the images displayed cannot be tuned separately, which allows very little freedom for a display engineer to perform color mapping of an electrophoretic display.

SUMMARY OF THE INVENTION

The first aspect of the present invention is directed to a driving method for an electrophoretic display, which method comprises applying a driving step in each of at least two electric fields to drive two types of pigment particles of different colors laterally and/or vertically for separately adjusting the grayscale and/or colors of the display.

In one embodiment, the two electric fields are in the X direction and the Z direction, respectively. In this embodiment, the driving steps may be carried out simultaneously or sequentially. Also in this embodiment, the method may further comprise applying one or more of refreshing, dithering or pre-charging step in any one or more of the electric fields.

In one embodiment, the method comprises applying a driving step in each of three electric fields. In this embodiment, the driving steps in the three electric fields may be carried out simultaneously or sequentially. Further in this embodiment, the method may comprise applying one or more of refreshing, dithering or pre-charging step in any one or more of the electric fields.

In one embodiment, the value $\Delta Vx$ of the voltage potential differences applied in the X electric field integrated over a time period ($\Delta tx$) is less than 1 Vsec. In one embodiment, the value $\Delta Vy$ of the voltage potential differences applied in the Y electric field integrated over a time period ($\Delta ty$) is less than 1 Vsec. In one embodiment, the value $\Delta Vz$ of the voltage potential differences applied in the Z electric field integrated over a time period ($\Delta tz$) is less than 1 Vsec.

A second aspect of the present invention is directed to an electrophoretic display, which comprises
 a) a first layer comprising a common electrode;
 b) a second layer comprising at least two pixel electrodes;
 c) a display cell layer comprising display cells filled with an electrophoretic fluid comprising at least two types of pigment particles of different colors dispersed in a solvent or solvent mixture; and
 d) at least two electric fields between the common electrode and the pixel electrodes.

In one embodiment, the display comprises three electric fields in the X direction, the Y direction and the Z direction, respectively wherein the X and Y electric fields move the pigment particles laterally and the Z electric field moves the pigment particles vertically.

In one embodiment, there is at least one of the three electric fields which comprises a driving step.

In one embodiment, each of two out of the three electric fields comprises a driving step. In this embodiment, the driving steps may be carried out simultaneously or sequentially. Also in this embodiment, each of the three electric fields may further comprise one or more of refreshing, dithering or pre-charging step.

In one embodiment, each of the three electric fields comprises a driving step. In this embodiment, the driving steps may be carried out simultaneously or sequentially. Also in this embodiment, each of the three electric fields may further comprise one or more of refreshing, dithering or pre-charging step.

In one embodiment, the two types of pigment particles are of the black and white colors dispersed in a clear solvent or solvent mixture. In this embodiment, the solvent or solvent mixture may be colorless or colored.

In one embodiment, one type of pigment particles is white and the other type of pigment particles is red, green, blue, cyan, magenta, yellow or a mixture thereof. In this embodiment, the two types of pigment particles may be dispersed in a black solvent or solvent mixture.

In one embodiment, the solvent or solvent mixture and the particles are of different colors.

In one embodiment, the two types of pigment particles have the same charge polarity or different charge polarities. In one embodiment, the two types of pigment particles have the same threshold or different thresholds. In one embodiment, the two types of pigment particles have the same degree of mobility or different degrees of mobility.

In one embodiment, the electrophoretic fluid further comprising a charge controlling agent, polymeric additives, liquid crystal additives, nano-particles, nano-wires or nano-tubes.

In one embodiment, the shape of the pixel electrodes is rectangular, zig-zag, hexagonal, square, circular or triangular In one embodiment, the pixel electrodes have the same size or different sizes.

The present driving method has the advantage that the brightness (e.g., grayscale) and color intensity of the images may be separately tuned.

BRIEF DISCUSSION OF THE DRAWINGS

DETAILED DESCRIPTION OF THE INVENTION

Figure 1A:
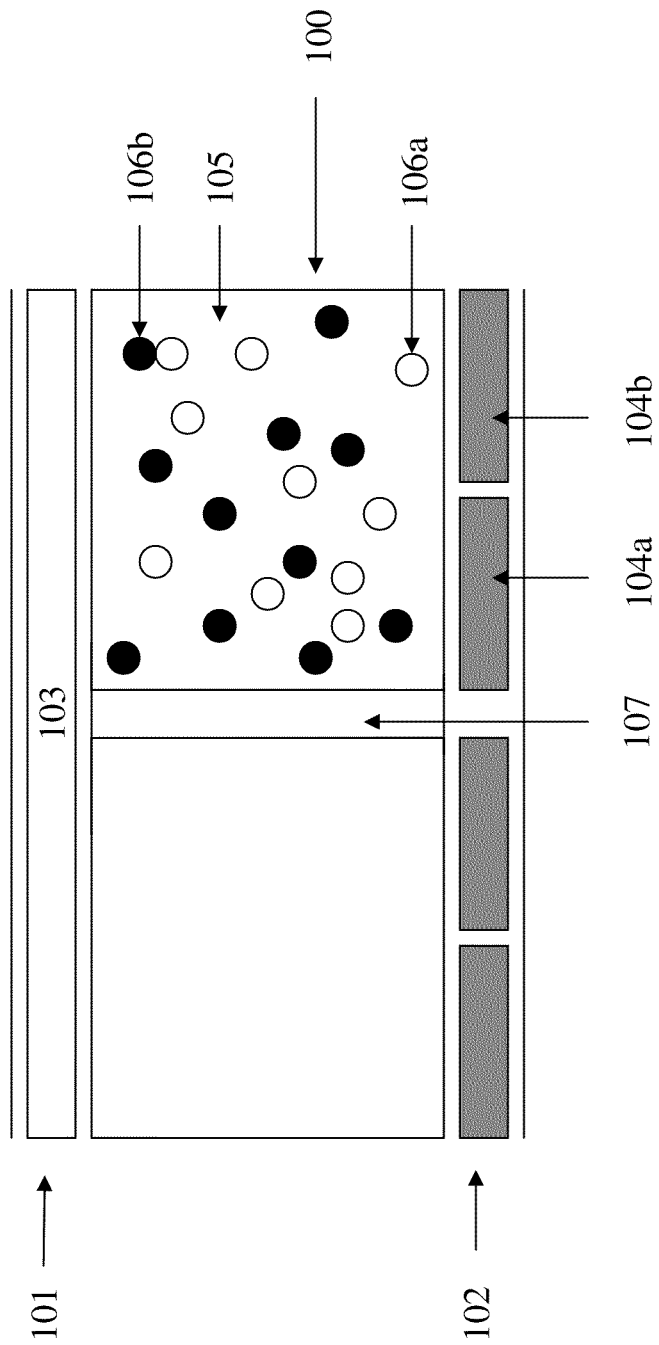
FIG. 1a depicts a cross-section view of a display device.

FIG. 1a depicts a cross-section view of a display device. A display cell (100) is sandwiched between a first layer (101) and a second layer (102). The display cell (100) is surrounded by partition walls (107). The first layer comprises a common electrode (103). The second layer comprises at least two pixel electrodes (104a and 104b).

The display cell (100) is a micro-container filled with a display fluid (105). It is understood that, in the context of the present invention, the term "display cell" is intended to encompass any micro-containers (e.g., microcups, microcapsules, microchannels or conventional partition type display cells), regardless of their shapes or sizes, as long as they perform the intended functions.

The display fluid (105) may be an electrophoretic fluid comprising at least two types of movable species. In one embodiment, the fluid comprises two types of pigment particles (106a and 106b) of different colors. For example, the two types of charged pigment particles may be white and black. They may also be of red, green, blue, cyan, magenta, yellow or a mixture thereof, as long as the colors of the two types of particles are visually distinguishable. The particles may be transparent or non-transparent. The particles may also absorb, scatter or reflect light.

The particles may or may not have a threshold potential. If they do, the threshold potentials for the different colored particles may be the same or different. The thresholds may be frequency-dependent or magnitude-dependent.

The temperature-dependent mobilities or temperature-dependent stabilities of the different colored particles may also be the same or different.

The particle size can range from 10 nm to 100 um, more preferably range from 100 nm to 10 um and most preferably range from 0.5 um to 3 um.

The polarities of the different colored particles may be different or the same. If they are the same, then the two types of particles may move at different speeds based on their different kinetic properties or mobilities.

In one embodiment, it is also possible for the zeta potential of some of the pigment particles to be modified. The charge level of the particles may range from highly charged to non-charged. A method of using polymer-coated surface to control the surface zeta potential of particles is disclosed in U.S. Pat. No. 4,690,749, the content of which is incorporated herein by reference in its entirety.

The materials for the particles may be inorganic pigments, such as $TiO_2$, $ZrO_2$, ZnO, $Al_2O_3$, CI pigment or the like (e.g., manganese ferrite black spinel or copper chromite black spinel). They also can be organic pigment such as phthalocyanine blue, phthalocyanine green, diarylide yellow, diarylide AAOT yellow, and quinacridone, azo, rhodamine, perylene pigment series from Sun Chemical, Hansa yellow G particles from Kanto Chemical, and Carbon Lampblack from Fisher.

The different colored pigment particles are dispersed in a solvent or solvent mixture. In one embodiment, the pigment particles are preferably dispersed in a clear solvent or solvent mixture.

The solvent or solvent mixture may be colorless. The solvent may also be colored when a colorant is added to the solvent. The solvent medium may also absorb, scatter or reflect light.

The solvent or solvent mixture in which the pigment particles are dispersed may be polar or non-polar. It preferably has a low viscosity and a dielectric constant in the range of about 2 to about 30, preferably about 2 to about 15 for high particle mobility. Examples of suitable dielectric solvent include hydrocarbons such as isopar, decahydronaphthalene (DECALIN), 5-ethylidene-2-norbornene, fatty oils, paraffin oil; silicon fluids; aromatic hydrocarbons such as toluene, xylene, phenylxylylethane, dodecylbenzene and alkylnaphthalene; halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane, pentachlorobenzene; and perfluorinated solvents such as FC-43, FC-70 and FC-5060 from 3M Company, St. Paul Minn., low molecular weight halogen containing polymers such as poly(perfluoropropylene oxide) from TCI America, Portland, Oreg., poly(chlorotrifluoro-ethylene) such as Halocarbon Oils from Halocarbon Product Corp., River Edge, N.J., perfluoropolyalkylether such as Galden from Ausimont or Krytox Oils and Greases K-Fluid Series from DuPont, Del., polydimethylsiloxane based silicone oil from Dow-corning (DC-200).

It is also noted that the different colored particles may be dispersed in a gas medium, such as in dry-powder electrophoretic displays. In other words, the display fluid may also be in a gaseous state.

The display fluid, in addition to the pigment particles, may also comprise one or more additives, such as a charge control agent, polymeric additives, liquid crystal additives, nano-particles, nano-wires or nano-tubes.

The common electrode (103) is usually a transparent electrode layer (e.g., ITO), spreading over the entire top of the display device. It is also possible for the first layer (101) to comprise more than one common electrode.

Figure 1B:
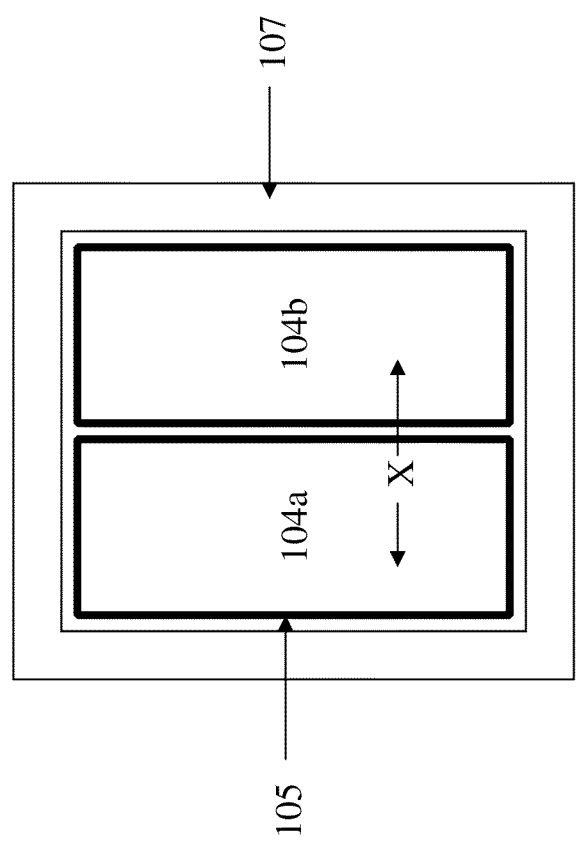
FIGS. 1b-1g illustrate different configurations of pixel electrodes.
Figure 1D:
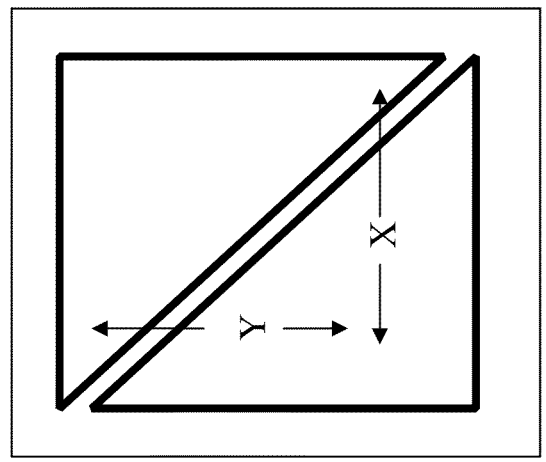

FIG. 1b depicts a plane view from the side of the second layer (102). In the embodiment as shown, the pair of pixel electrodes (104a and 104b) together cover substantially the entire display fluid area (105), but they preferably do not cover any of the partition wall area (107). The two pixel electrodes may be of the same size or different sizes.

The gap between the two pixel electrodes is in the micron range. However the two pixel electrodes cannot be too close to each other as that may cause short circuit. It is also noted that in some of the drawings, the gaps between the pixel electrodes are exaggerated for clarity.

The pair of pixel electrodes in FIG. 1b is shown to have a rectangular shape. However, the shapes and sizes of the pixel electrodes may vary, as long as they serve the desired functions. For example, the pixel electrodes may be rectangular, zig-zag, hexagonal, square, circular or triangular. FIGS. 1c-1g provide a few examples of pixel electrodes of other shapes and sizes.

The pixel electrodes on the second layer (102) may be active matrix or passive matrix driving electrodes or other types of electrodes, as long as the electrodes serve the desired functions.

One of the unique features of the present driving method is that the method has at least two independent electric fields to drive the pigment particles laterally or vertically. The independent electric fields may simultaneously or sequentially change the charge levels of the particles, the relative positions between the particles and the relative positions between the particles and the boundaries of display cells.

Figure 2A:
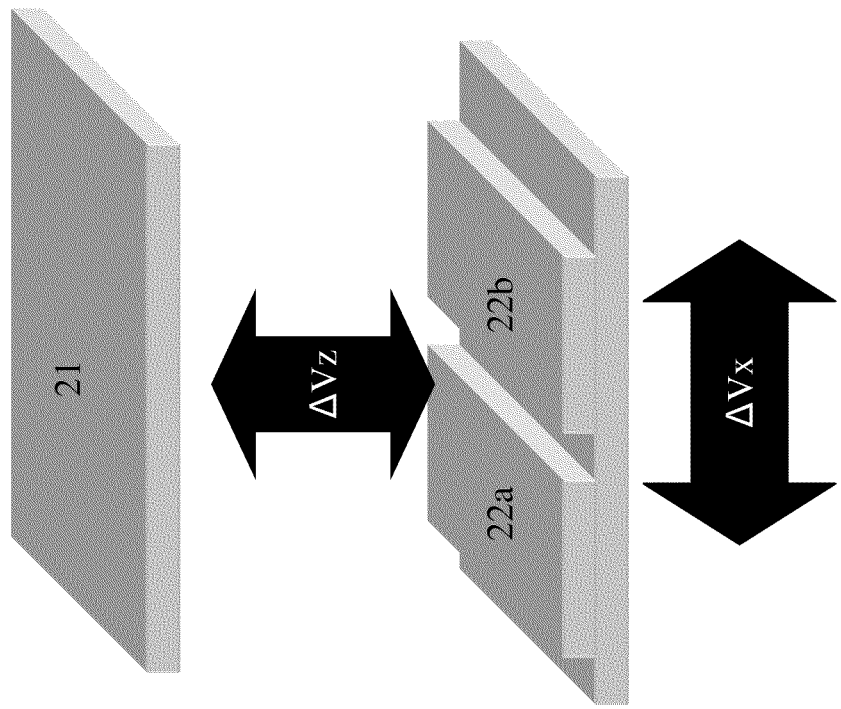
FIG. 2a-2c show how the electric fields are operated by the present driving method.
Figure 2A:
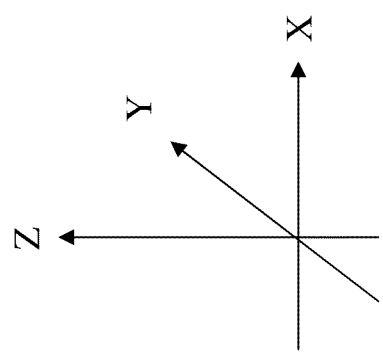

In FIG. 2a, there are two independent electric fields, one in the X direction and the other in the Z direction. The X direction field (hereinafter "the X field") allows the particles to move from one pixel electrode (22a) to the other pixel electrode (22b) or vice versa, in a lateral manner. The Z direction field (hereinafter "the Z field") allows the particles to move in a vertical manner, between the common electrode (21) and the pixel electrodes (22a or 22b). Therefore the X field is generated by applying a voltage potential difference ($\Delta V_x$) between the pixel electrodes (22a and 22b) and the Z field is generated by applying a voltage potential difference ($\Delta V_z$) between the common electrode (21) and the pixel electrode (22a) and/or between the common electrode (21) and the pixel electrode (22b).

In the context of the present invention, when there are more than one voltage potential difference in the same direction, such multiple voltage potential differences are collectively referred to as an electric field in that direction.

Therefore, in FIG. 2a, there are two possible $\Delta V_z$ (one between the common electrode 21 and the pixel electrode 22a and another between the common electrode 21 and the pixel electrode 22b). The two voltage potential differences $\Delta V$ in the Z direction are collectively referred to as the Z electric field.

Figure 2B:
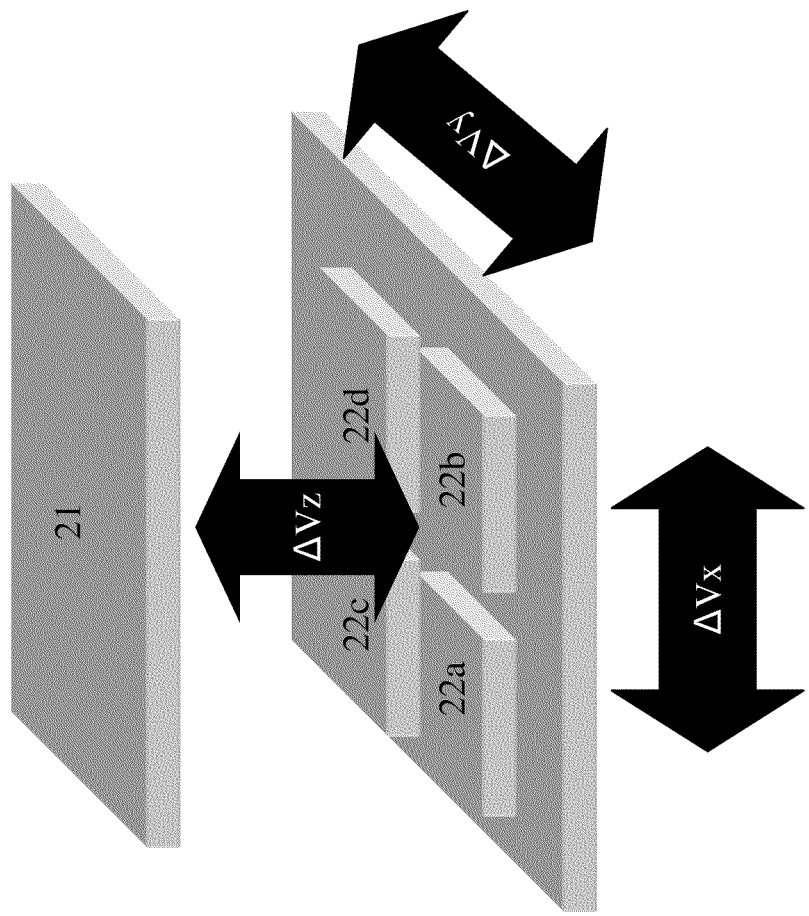
Figure 2B:
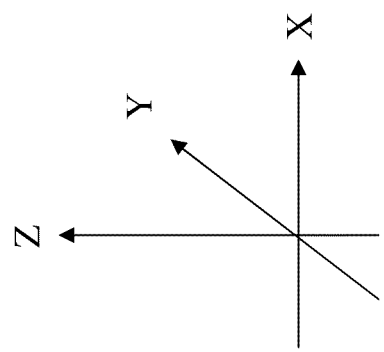

In FIG. 2b, there are three independent electric fields, one in the X direction, one in the Y direction and one in the Z direction. The X field allows the particles to move between pixel electrode (22a) and pixel electrode (22b) or between pixel electrode (22c) and pixel electrode (22d). Such electric field is generated by applying a voltage potential difference ($\Delta V_x$) between the two pixel electrodes (22a and 22b or 22c and 22d). The Y direction field (hereinafter "the Y field") allows the particles to move between the pixel electrode (22a) and pixel electrode (22c) or between pixel electrode (22b) and pixel electrode (22d). The Y field therefore is generated by applying a voltage potential difference ($\Delta V_y$) between the two electrodes in each pair. The Z field allows the particles to move in a vertical manner, between the common electrode (21) and the pixel electrodes (22a, 22b, 22c or 22d), and therefore the Z field is generated by applying a voltage potential difference ($\Delta V_z$) between the common electrode (21) and any one or more of the pixel electrodes (22a-22d).

In FIG. 2b, there are two voltage potential differences in the X direction (one between pixel electrode 22a and pixel electrode 22b and another between pixel electrode 22c and pixel electrode 22d). The two voltage potential differences are collectively referred to as an X electric field.

Similarly, the two voltage potential differences $\Delta V_y$ (one between pixel electrode 22a and pixel electrode 22c and another between pixel electrode 22b and pixel electrode 22d) are collectively referred to as a Y electric field. Furthermore, the four voltage potential differences $\Delta V_z$ are collectively referred to as the Z electric field.

Figure 2C:
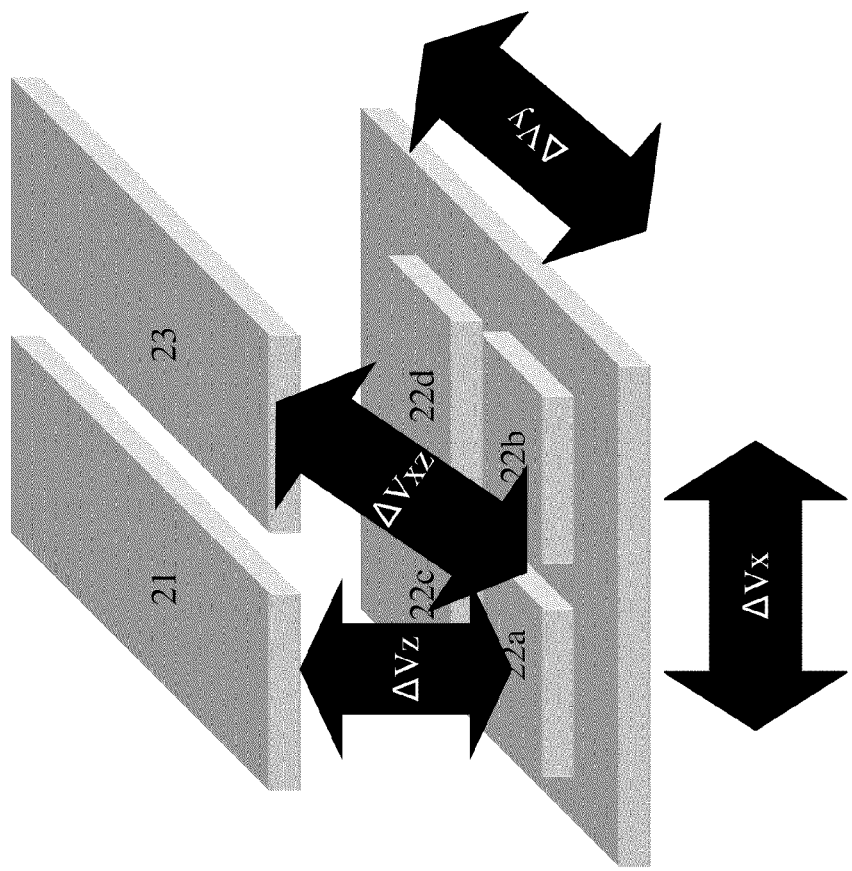
Figure 2C:
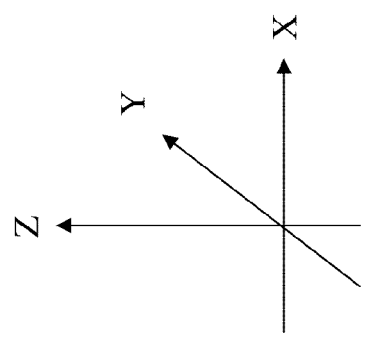

In FIG. 2c, in addition to the three fields illustrated in FIG. 2b, there is one additional electric field between the second common electrode (23) and the pixel electrode (22a-22d), which may be expressed as a vector ($\Delta V_{xz}$) combining the two independent electric fields ($\Delta V_x + \Delta V_z$).

It is noted that the direction of an electric field is based on the direction of the voltage potential difference, which is not necessarily the exact direction of movement of the particles. Therefore, the term "lateral mixing" or "lateral movement", according to the present invention, refers to the fact that the particles are driven by the "lateral field (in the X direction and/or the Y direction) to achieve the effect of "mixing" or "movement". But actually, these particles may deviate from the exact X direction or Y direction, owing to the hydrodynamics. For example, the direction deviation may be caused by turbulence or particle to particle collisions.

Figure 1C:
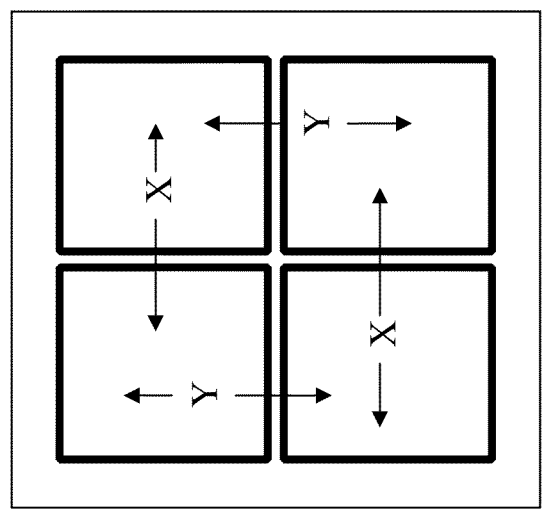
Figure 1F:
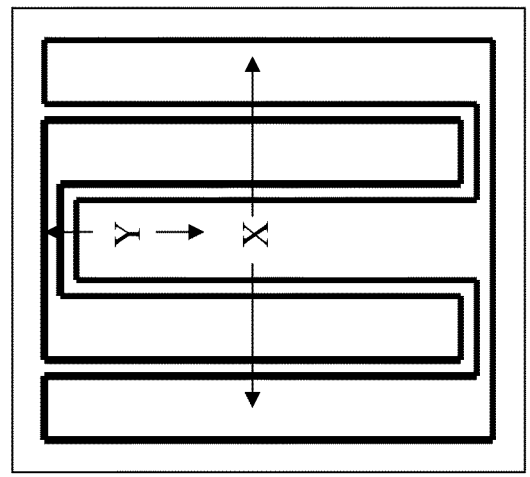
Figure 1E:
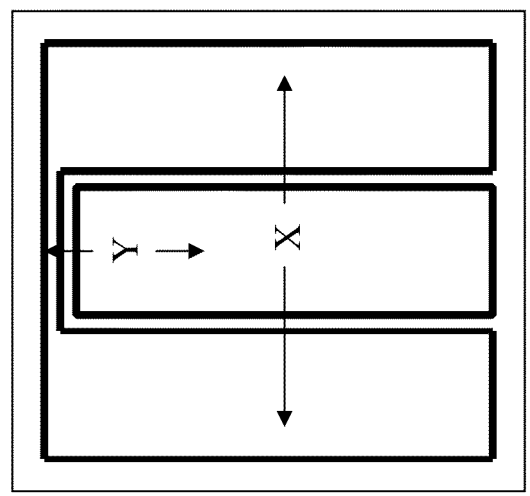
Figure 1G:
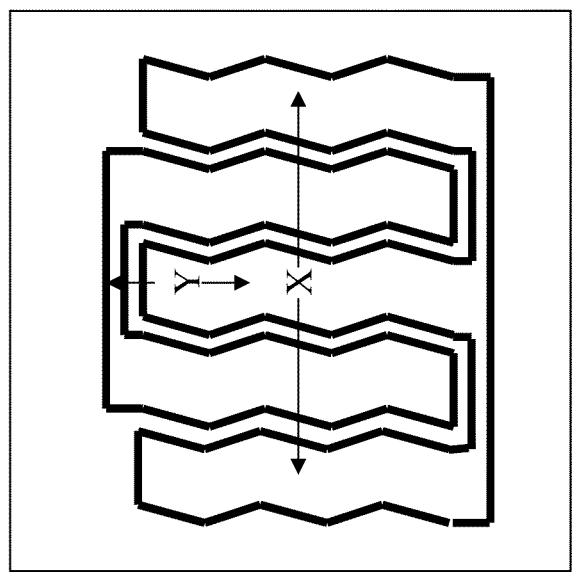

As an example, FIG. 1e shows that one pixel electrode may be applied a +V and the other pixel electrode may be applied a −V, thus an electric field is generated in the X direction and another electric field is generated in the Y direction. But the particles may move in various directions on or close to the plane of the pixel electrodes.

Therefore, as shown, the pixel electrodes in FIGS. 1d, 1e, 1f and 1g may potentially generate three independent electric fields in the X, Y and Z directions and the operation of which would be similar to that presented in FIG. 2b based on the configuration of FIG. 1c.

Utilizing a display fluid comprising black and white particles dispersed in a colored medium (e.g., red, green, blue, cyan, magenta or yellow) as an example, the steps of the present driving method are illustrated in FIGS. 3 & 4.

Figure 3B:
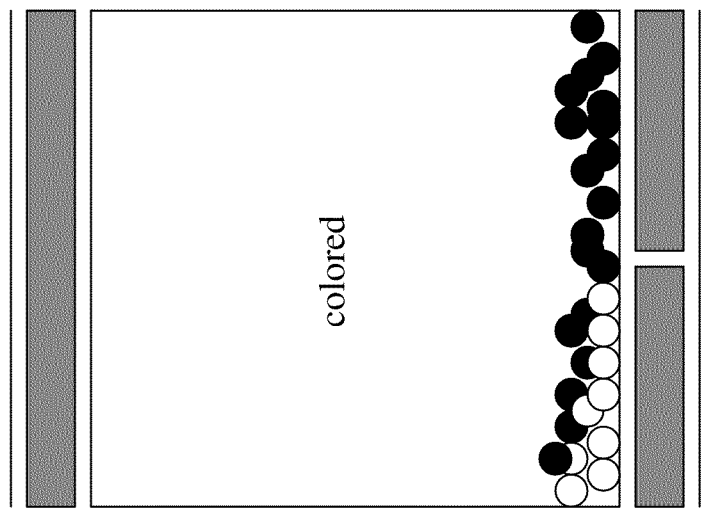
FIGS. 3a-3d illustrate how the color brightness of a display device may be adjusted by the present driving method.
Figure 3A:
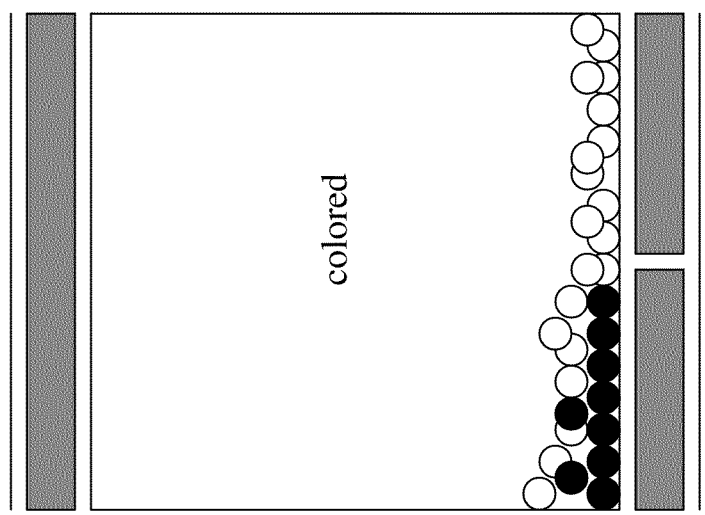

In one of the steps (see FIG. 3), an X field and/or a Y field are generated to move the two types of particles laterally so that they may be stacked as shown. In FIG. 3a, some of the white particles are on top of the black particles and in this case, the brightness is enhanced. In FIG. 3b, some of the black particles are on top of the white particles, which would cause the color to appear to be darker. The degree of compactness of the two types of the particles and how they are stacked depend on the voltage potential differences ($\Delta V_x$ and/or $\Delta V_y$) applied in the two independent electric fields and also the time lengths in which the potential differences are applied. By applying different voltage potentials and different time lengths, the degree of mixing may be varied to render different gray levels.

Figure 3D:
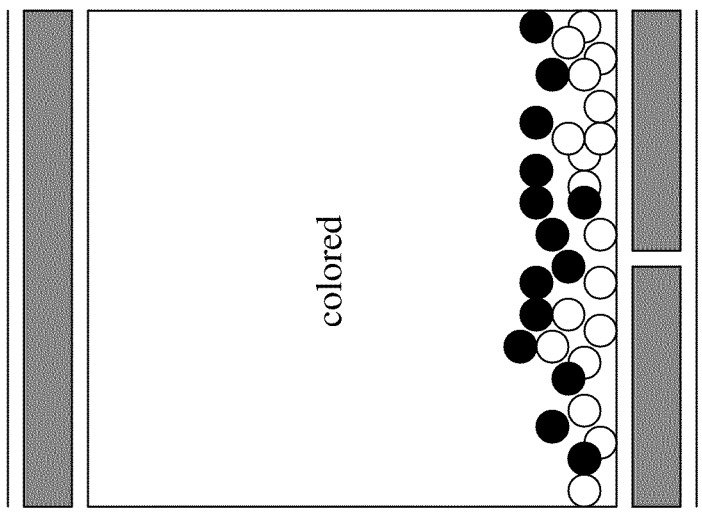
Figure 3C:
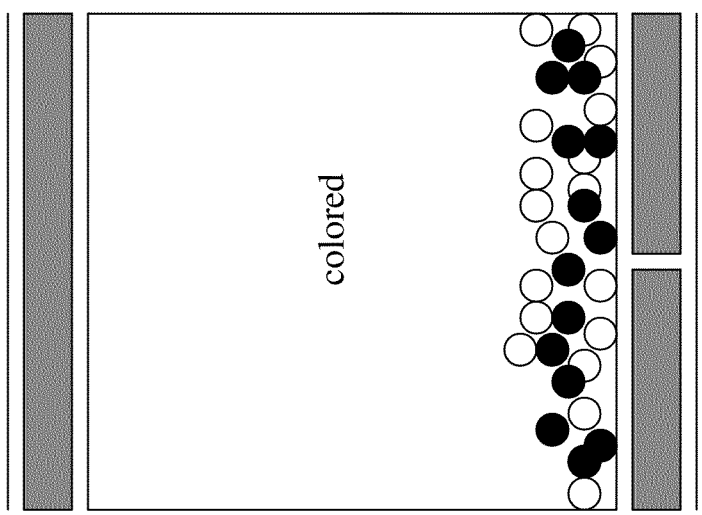

FIGS. 3c and 3d illustrate an alternative scenario in which one type of the pigment particles is on top of the other type of the pigment particles. Ideally, the pigment particles are arranged in the manner as shown in FIGS. 3a and 3b. However, in practice, the arrangement as shown in FIGS. 3c and 3d is also likely.

FIG. 4 illustrates a step involving the vertical driving of the current method. As shown when a voltage potential difference ($\Delta V_z$) is applied, the two types of particles would move between the common electrode and the pixel electrodes. The end positions of the particles would depend on the voltage potential difference(s) applied and the time length(s) in which the voltage potential difference(s) is applied. The vertical driving would impact mostly on the color saturation (i.e., color intensity) when the particles are dispersed in a colored solvent or solvent mixture. By changing the positions of the particles vertically, the depth that external light may pass through the colored medium would change. As a result, the color saturation displayed may be adjusted.

Figure 4A:
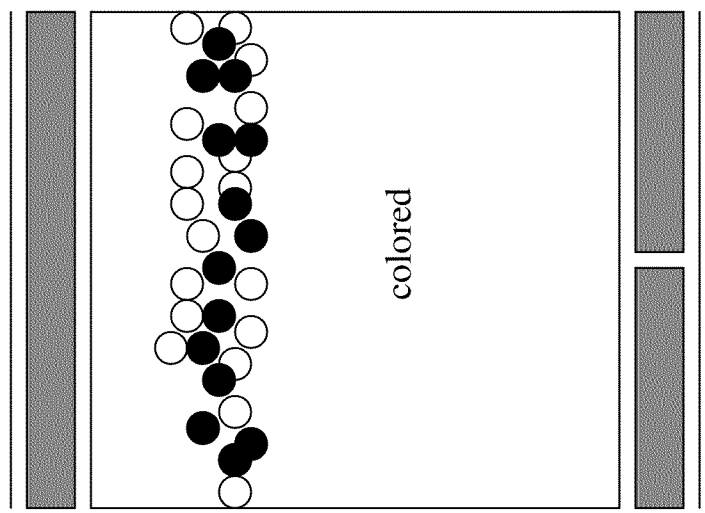
FIGS. 4a and 4b illustrate how the color saturation of a display device may be adjusted by the present driving method.
Figure 4B:
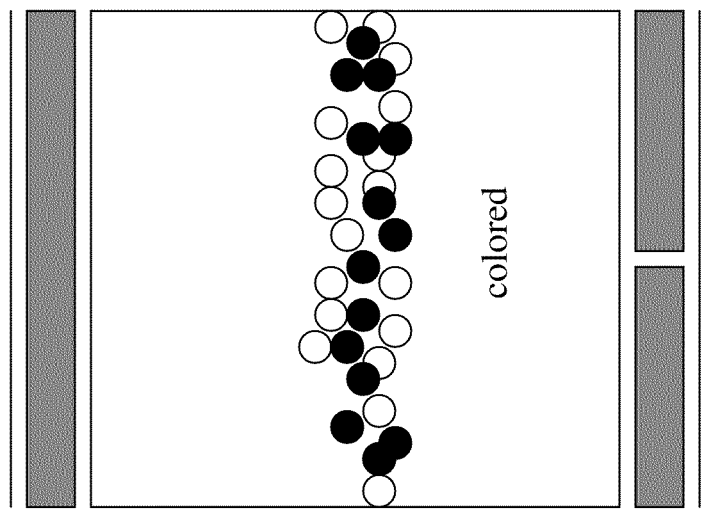
Figure 5B:
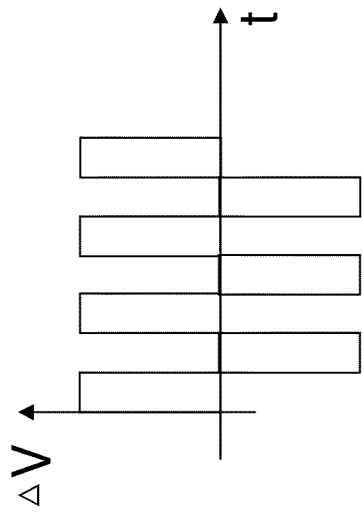
FIGS. 5a-5d show sample driving waveforms.
Figure 5D:
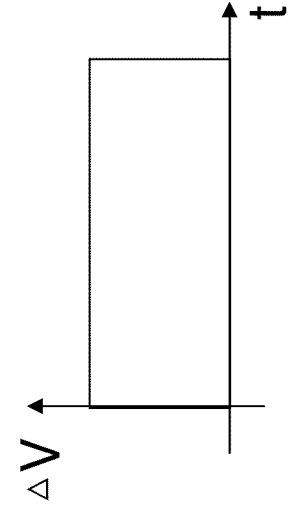
Figure 5A:
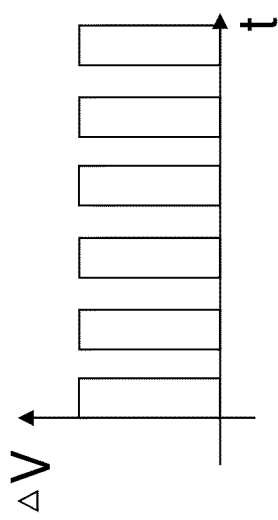
Figure 5C:
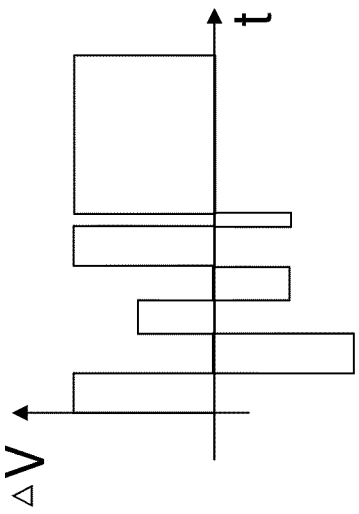

FIGS. 4a and 4b show the same stack of particles in which more white particles are on top of the black particles. However because any external light would have to travel deeper into the colored medium to reach the stack of particles in FIG. 4b, the color displayed in FIG. 4b would be more saturated than that in FIG. 4a.

In one embodiment of the present method, the two types of particles of different colors have the same polarity; but of different thresholds. In this case, the lateral mixing of the different colored particles may be achieved by applying a voltage which is higher than the threshold of one type of the particles but lower than the threshold of the other type of the particles. The applied voltage would cause the particles which have a lower threshold to move, leading to a desired grey level.

The vertical movement of the different colored particles may then be achieved by applying a voltage which is higher than the thresholds of both types of the particles. The applied voltage would then cause both types of particles to move in the same direction, preferably without changing their relative positions. To achieve the effect of this vertical driving step to maintain the relative positions between the particles having different thresholds, the charge, size, density, volume, hydrophilicity or shape of the particles which have a higher threshold may be modified to cause them to be more sensitive to the electric field. As a result, even the effective voltage (the applied voltage minus the threshold voltage) on the particles having a higher threshold is lower, those particles can still move as fast as the particles having a lower threshold.

In this scenario, the grey level achieved from the lateral mixing step would be maintained. However, the vertical depth of the stack of the particles would change as shown in FIGS. 4a and 4b and as a result, different degrees of color saturation would be observed.

In another embodiment, the two types of pigment particles may have different polarities and different degrees of mobility. In this case, a voltage may be applied to cause the lateral mixing of the particles. For vertical movement of the particles, because the particles have different degrees of mobility, the grey level may shift while a voltage is applied. However, the expected degree of shift may be compensated prior to the vertical movement step. For example, in order to achieve a desired color state with a lightness of 30 L* after the vertical movement step and if it is expected that during the vertical movement there would be a loss of 5 L* in lightness, then the targeted lightness after the lateral mixing should be 35 L*. In this case, the deviation of −5 L* during vertical movement has already been pre-added in the lateral mixing step. As a result, the desired lightness of 30 L* may be achieved at the end of the driving step. In addition, the deviations in other optical properties, such as hue or saturation, may also be compensated with the same concept.

The "driving step", in the context of the present invention, is intended to refer to a step in which a voltage potential difference (e.g., in the form of a waveform) is applied to move the particles to their desired destinations.

Prior to or after the driving step, in the present driving method, there are optional "refreshing", "dithering" or "pre-charging" step which may be applied. These steps are beneficial; but not always necessary. For example, the purpose of the refreshing step is to facilitate erasing the previous image and also to cause the particles to be randomly redistributed. The purpose of the "dithering" step is to mix and/or pack the particles to alter the optical properties of the particle mixture. The effective charge or mobility of the particles may be increased by a "pre-charging" step.

FIGS. 5a-5d show four sample waveforms each of which may be used for any of the "refreshing", "dithering" or "pre-charging" step. The sample waveforms may also be used in a driving step under any of the independent electric fields.

In practice, for a particular electric field (X, Y or Z), there may be one or more of the following four steps, refreshing, pre-charging, dithering or actual driving. The steps may be carried out in any order.

Figures 6A, 6B:
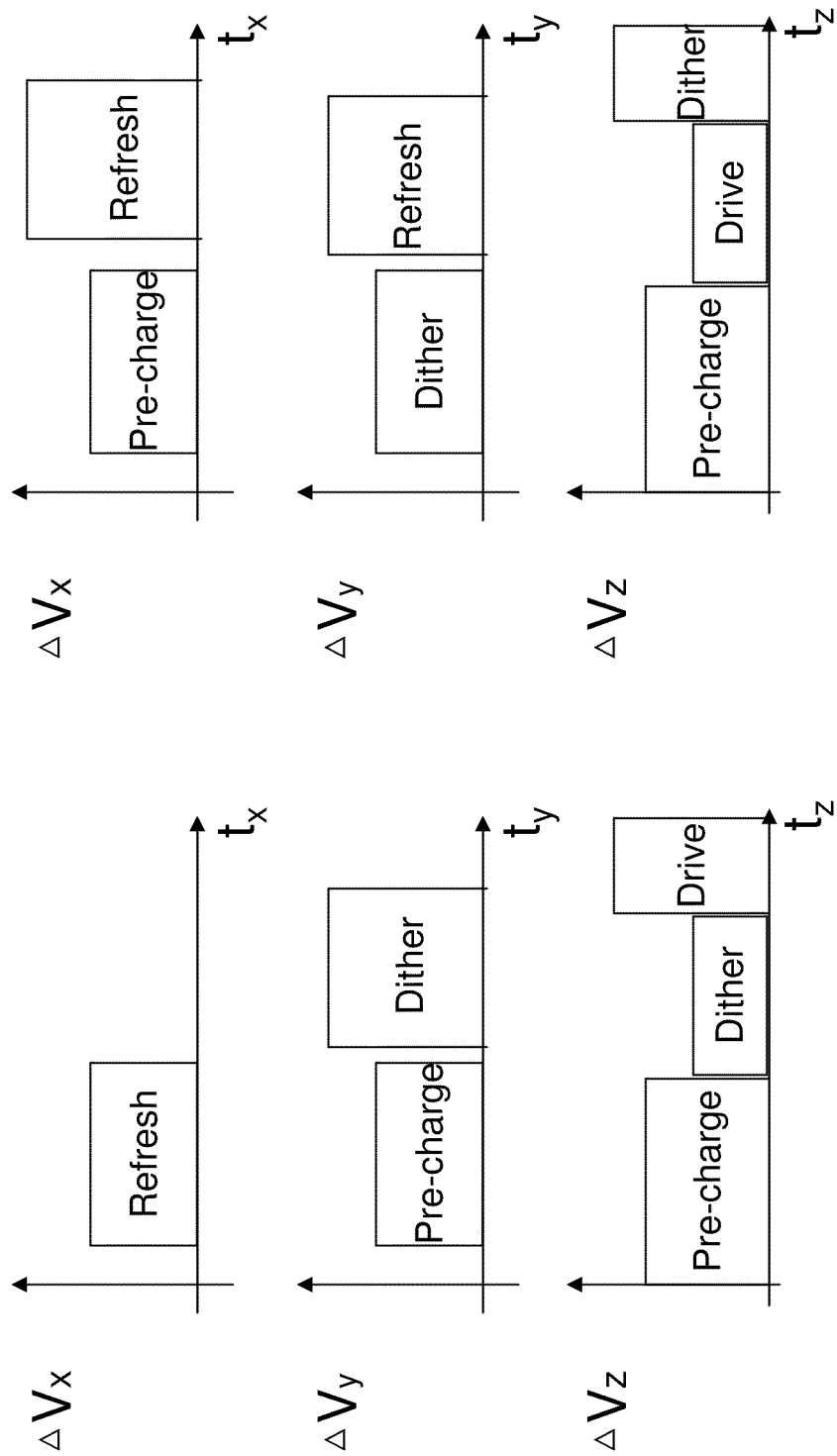
FIGS. 6a-6d show examples of the present driving method.
Figures 6C, 6D:
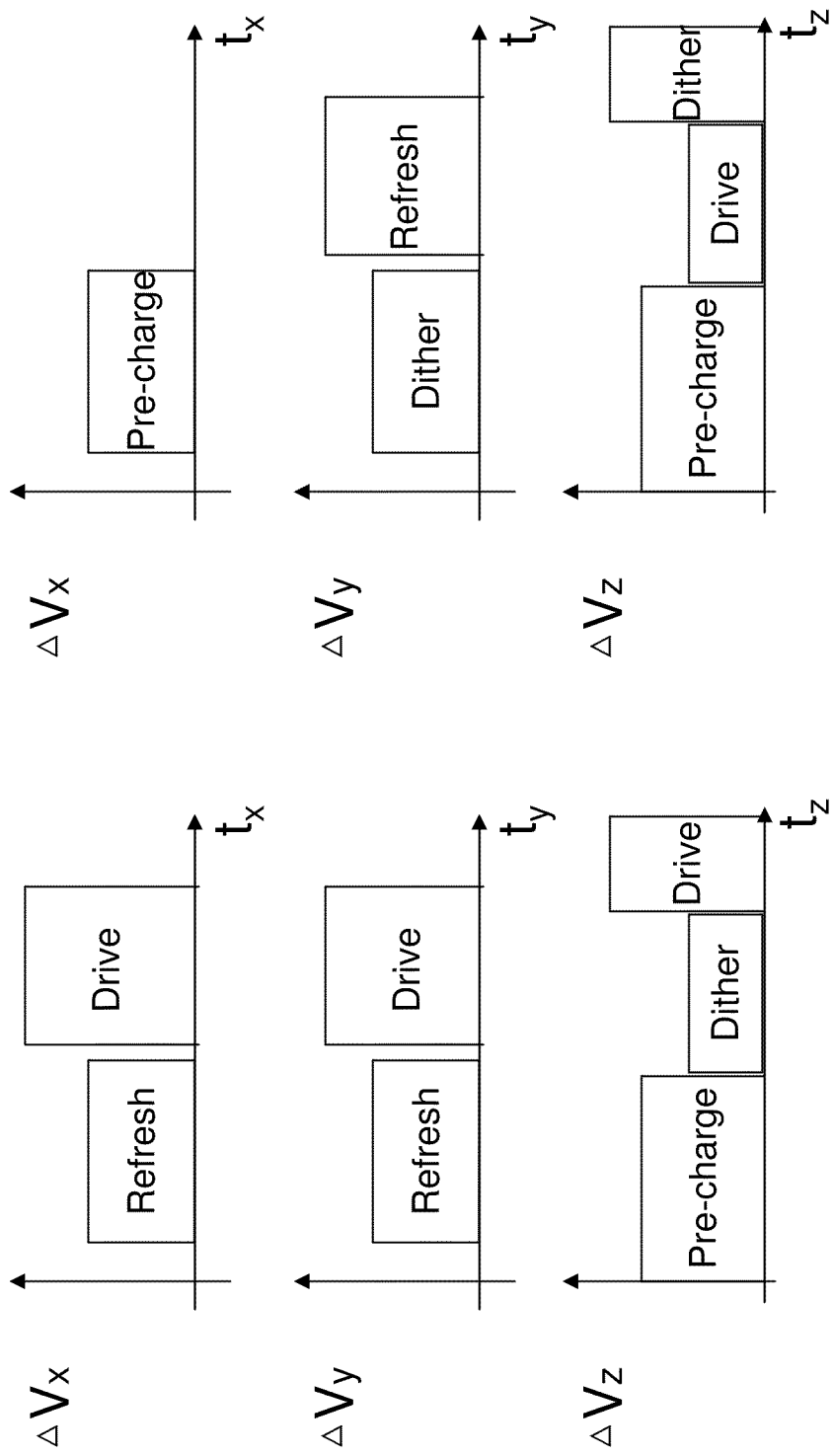
Figure 7:
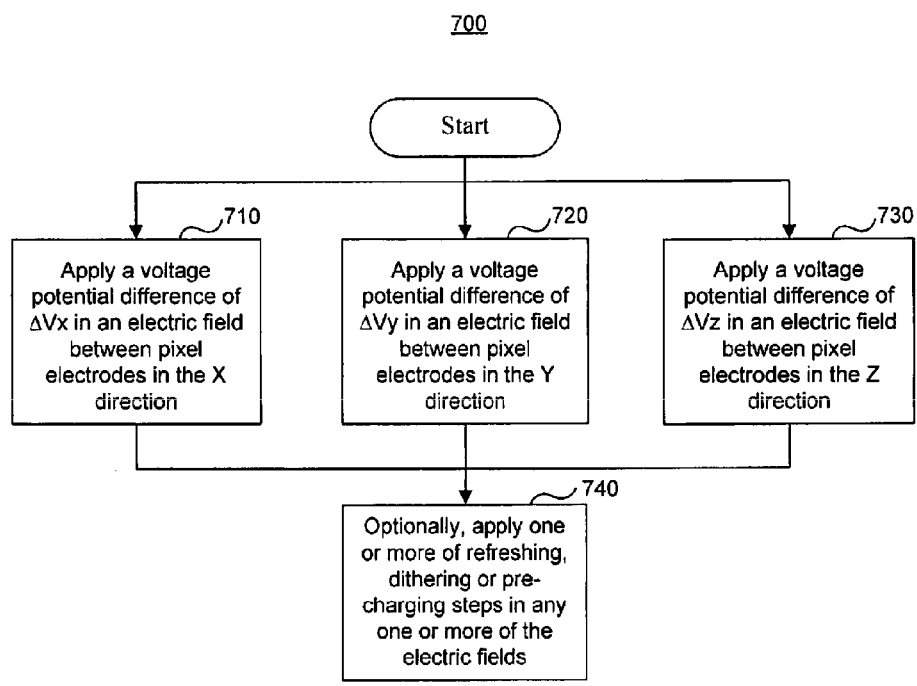
FIGS. 7 shows an example of a process for driving an electrophoretic display.

It is noted that there may be no step carried out at all in a particular field. However there must be at least one driving step among the electric fields. For example, in FIGS. 6a, 6b and 6d, the driving step occurs only in the Z field and in FIG. 6c, the driving step occurs in all three fields. Of course, it is also possible for the driving step only occurring in the X or Y field or in any of the two fields.

In addition, in a particular field, a particular step (i.e., dithering, refreshing, pre-charging or driving) may be repeated using the same or a different waveform.

FIGS. 6a-6d show examples of the present driving method. While not clearly shown, the time axes ($t_x$, $t_y$, & $t_z$) of the three fields in each of the figures are actually independent from each other. For example, in FIG. 6a, the refresh step in the X field, the pre-charging step in the Y field and the pre-charging step in the Z field do not have to occur at or about the same time point. They may occur simultaneously or sequentially. In fact, it is also possible for all of the steps in one field to be completed before the first step in another field starts.

In one embodiment, each of the independent electric fields is preferably charged neutralized. In other words, the value ($\Delta V$) of the voltage potential differences applied in an independent electric field, integrated over a time period ($\Delta t$), is substantially 0 Vsec, preferably less than 1 Vsec. For example, in the X field, the value $\Delta V_x$ of the voltages potential differences applied (for the driving step and other optional steps if present) integrated over a time period ($\Delta t_x$) is substantially 0 Vsec, preferably less than 1 Vsec. This may also be applied to the Y and Z electric fields.

Accordingly, the following also apply:

The sum of (1) the value $\Delta V_x$ of the voltages potential differences applied integrated over a time period ($\Delta t_x$) and (2) the value $\Delta V_y$ of the voltages potential differences applied integrated over a time period ($\Delta t_y$) is substantially 0 Vsec, preferably less than 2 Vsec.

The sum of (1) the value $\Delta V_y$ of the voltages potential differences applied integrated over a time period ($\Delta t_y$) and (2) the value $\Delta V_z$ of the voltages potential differences applied integrated over a time period ($\Delta t_z$) is substantially 0 Vsec, preferably less than 2 Vsec.

The sum of (1) the value $\Delta V_x$ of the voltages potential differences applied integrated over a time period ($\Delta t_x$) and (2) the value $\Delta V_z$ of the voltages potential differences applied integrated over a time period ($\Delta t_z$) is substantially 0 Vsec, preferably less than 2 Vsec.

The sum of (1) the value $\Delta V_x$ of the voltages potential differences applied integrated over a time period ($\Delta t_x$), (2) the value $\Delta V_y$ of the voltages potential differences applied integrated over a time period ($\Delta t_y$) and (3) the value $\Delta V_z$ of the voltages potential differences applied integrated over a time period ($\Delta t_z$) is substantially 0 Vsec, preferably less than 3 Vsec.

The present driving method is also applicable to a multi-color display device, as the method may separately tune the brightness and saturation of the colors displayed by the display device. If the display fluid comprises two types of particles, white and red, dispersed in a black solvent, the driving step(s) in the X field and Y field may move one type of the particles above or below another type of the particles as shown in FIGS. 3a-3d. When more red particles are on the top of the white particles, a red color of higher intensity is displayed and while more white particles are on top of the red particles, a pale red color would appear. While in combination with the Z field driving as shown in FIGS. 4a and 4b, the saturation of the colors may also be adjusted. For example, if a stack of red and white particles with more red particles on top of the white particles is moved upwards, the red color would not be as dark as if the same stack of particles with more red particles on top is moved downwards.

As stated, the particles may be of any colors in a display device. However it is preferred that one type of the particles is white. The solvent may also be of any colors.

The magnitude of the electric fields generated according to the present invention may range from about 0.01V/μm to about 100V/μm. The independent electric fields may have the same or different magnitudes.

The driving method of the present invention may be carried out under various conditions (e.g., 1% to 90% relative humidity and/or −50° C. to 150° C.).

The total driving time for the method may vary; but it is expected that the driving can be completed within about 1 millisecond to minutes. During driving, the relative vertical or lateral positions of the particles may change, which means that the individual particles may move in different directions and/or at different speeds. It is also possible for the individual particles to move at the same speed and/or in the same direction.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A driving method for an electrophoretic display, wherein said display comprises a display cell layer comprising display cells and each of said display cells is filled with an electrophoretic fluid which fluid comprises at least two types of pigment particles of different colors dispersed in a solvent or solvent mixture, which method comprises simultaneously applying:
   i) a voltage potential difference of $\Delta Vx$ in an electric field between pixel electrodes in the X direction;
   ii) a voltage potential difference of $\Delta Vy$ in an electric field between pixel electrodes in the Y direction; and
   iii) a voltage potential difference of $\Delta Vz$ in an electric field between a common electrode and pixel electrodes in the Z direction.

2. The method of claim 1, further comprising applying one or more of refreshing, dithering or pre-charging steps in any one or more of the electric fields.

3. The method of claim 1, wherein the value $\Delta Vx$ integrated over a time period ($\Delta tx$) is less than 1 Vsec.

4. The method of claim 1, wherein the value $\Delta Vy$ integrated over a time period ($\Delta ty$) is less than 1 Vsec.

5. The method of claim 1, wherein the value $\Delta Vz$ integrated over a time period ($\Delta tz$) is less than 1 Vsec.

6. The method of claim 1, wherein the sum of the value $\Delta V_x$ integrated over a time period ($\Delta t_x$) and the value $\Delta V_y$ integrated over a time period ($\Delta t_y$) is less than 2 Vsec.

7. The method of claim 1, wherein the sum of the value $\Delta V_y$ integrated over a time period ($\Delta t_y$) and the value $\Delta V_z$ integrated over a time period ($\Delta t_z$) is less than 2 Vsec.

8. The method of claim 1, wherein the sum of the value $\Delta V_x$ integrated over a time period ($\Delta t_x$) and the value $\Delta V_z$ integrated over a time period ($\Delta t_z$) is less than 2 Vsec.

9. The method of claim 1, wherein the sum of the value $\Delta V_x$ integrated over a time period ($\Delta t_x$), the value $\Delta V_y$ integrated over a time period ($\Delta t_y$) and the value $\Delta V_z$ integrated over a time period ($\Delta t_z$) is less than 3 Vsec.

10. The method of claim 1, wherein the electric fields in the X and Y directions move the pigment particles laterally and the electric field in the Z direction moves the pigment particles vertically.

11. The method of claim 1, wherein there are two types of pigment particles which are of the black and white colors respectively, dispersed in a clear solvent or solvent mixture.

12. The method of claim 11, wherein the solvent or solvent mixture is colorless.

13. The method of claim 11, wherein the solvent or solvent mixture is colored.

14. The method of claim 11, wherein the solvent or solvent mixture is red, green, blue, cyan, magenta, yellow or a mixture thereof.

15. The method of claim 1, wherein there are two type of pigment particles in which one type of pigment particles is white and the other type of pigment particles is red, green, blue, cyan, magenta, yellow or a mixture thereof.

16. The method of claim 15, wherein the two types of pigment particles are dispersed in a black solvent or solvent mixture.

17. The method of claim 1, wherein the solvent or solvent mixture and the pigment particles are of different colors.

18. The method of claim 1, wherein the pigment particles have the same charge polarity or different charge polarities.

19. The method of claim 1, wherein the pigment particles have the same threshold or different thresholds.

20. The method of claim 1, wherein the pigment particles have the same degree of mobility or different degrees of mobility.

21. The method of claim 1, wherein said electrophoretic fluid further comprising a charge controlling agent, polymeric additives, liquid crystal additives, nano-particles, nano-wires or nano-tubes.

22. The method of claim 1, wherein shape of the pixel electrodes is rectangular, zig-zag, hexagonal, square, circular or triangular.

23. The method of claim 1, wherein the pixel electrodes have the same size or different sizes.

* * * * *